United States Patent [19]

Brouwer et al.

[11] Patent Number: 4,728,695
[45] Date of Patent: Mar. 1, 1988

[54] CROSSLINKED RESINS CONTAINING THERMALLY STABLE SULFONIC ACID GROUPS

[75] Inventors: Dirk M. Brouwer; Elizabeth M. Van de Vondervoort, both of Amsterdam, Netherlands

[73] Assignee: Shell Oil Company, Houston, Tex.

[21] Appl. No.: 831,398

[22] Filed: Feb. 20, 1986

[30] Foreign Application Priority Data

Mar. 21, 1985 [GB] United Kingdom ................ 8507328

[51] Int. Cl.$^4$ .......................................... C08F 257/00
[52] U.S. Cl. .................................... 525/291; 525/332.2
[58] Field of Search .................. 525/291, 332.1, 332.2, 525/333.3, 333.5

[56] References Cited

U.S. PATENT DOCUMENTS 3,573,093  3/1971  Oshibuchi .......................... 526/287
3,929,740  1/1975  Engelhardt et al. ................. 526/287

OTHER PUBLICATIONS

Makromolekulare Chemie, vol. 184, pp. 1585–1596, (1983).
Encyclopedia of Polymer Science and Technology, vol. 7, pp. 693–742.
Frechet et al, Organic Chemistry, vol. 44, No. 11, (1979), p. 1776.
H. Distler, Angewandte Chemie, International Edition, vol. 4, (1965), No. 4, pp. 300–311.

Primary Examiner—Christopher Henderson

[57] ABSTRACT

Novel crosslinked resins comprising at least on substituted aryl group having a functional substituent group of the general formula

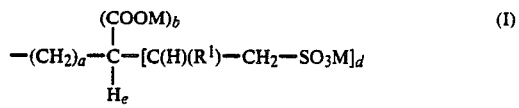

can be prepared via the addition reaction of a crosslinked resin comprising at least one substituted aryl group having a functional substituent group of general formula

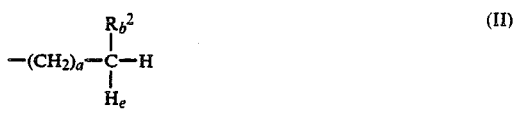

and an ester of an alkenesulfonic acid of general formula

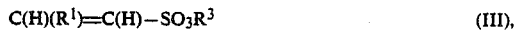

wherein, a is 0 or 1, b is 1 or 2, d is 1 or 2, e is 0 or 1, $R^1$ represents H or a $C_1$–$C_4$ alkyl group, $R^2$ is a —CN or a carboxyester group, $R^3$ is hydrocarbyl group, M is a proton or another cation, and moreover that in general formula (I) $b+d+e=3$, and in general formula (II) that $b+e=2$ and if b is 2 each $R^2$ is a —CN or a carboxyester group, followed by hydrolysis of the addition product into a functional group of general formula (I). Said resins are extremely stable at elevated temperatures in water or aqueous media and show a high catalytic activity.

7 Claims, No Drawings

CROSSLINKED RESINS CONTAINING THERMALLY STABLE SULFONIC ACID GROUPS

FIELD OF THE INVENTION

The present invention relates to crosslinked resins containing thermally stable sulfonic acid groups, in particular to thermally stable sulfoalkylated polystyrene-divinylbenzene resins, and to their preparation and use.

BACKGROUND OF THE INVENTION

Sulfonated polystyrene-divinylbenzene (PS/DVB) resins have been commercially available for many years and used as cation exchange resin in many different applications such as in water treatment, in recovery of metals from aqueous solutions, as catalysts, in chromatography etc. However, their applicability has been restricted due to their low thermal stability in water or water-containing media. Above 150° C. the aromatic sulfonic acid groups are increasingly hydrolyzed.

A class of sulfonated PS/DVB resins less susceptible to thermal degradation are the sulfoalkylated PS/DVB resins, which have been disclosed in Makromolekulare Chemie, Vol. 184, pp. 1585-1596 (1983). Also disclosed was evidence of their thermal stability, established by measuring the cation exchange capacity of these resins after heating aqueous suspensions of these products in an autoclave at 200° C. Whereas with a conventional sulfonated PS/DVB resin, 75% of the sulfonic acid groups had disappeared after 48 hours, with the sulfomethylated and sulfoethylated resins the loss of sulfonic acid groups was only 30–45% and 20% respectively. Although it was reported that problems had been experienced with the synthesis of the corresponding sulfopropylated resins, even with these resins the loss of sulfonic acid groups was never more than 60% under the above mentioned conditions.

Although these sulfoalkylated resins were found to be more stable at elevated temperatures compared with the conventional sulfonated PS/DVB resins, there is room for improvement, especially when they are used as catalysts in processes which are conducted at high temperatures for long periods of time. Under those circumstances catalyst instability, i.e. premature loss of sulfonic acid groups, would be unacceptable.

Surprisingly a novel class of sulfoalkylated resins has now been synthesized, having a thermal stability—by which we mean stability of the resin in the acid form at elevated temperatures in the presence of water or in aqueous media, hereinafter referred to as thermal stability—which surpasses that of the sulfoalkylated resins previously described. These novel resins are characterized in that the alkyl group carries, in addition to the sulfonic acid group, at least one carboxy group.

SUMMARY OF THE INVENTION

The present invention provides therefore crosslinked resins comprising at least one substituted aryl group having a functional substituent group of general formula

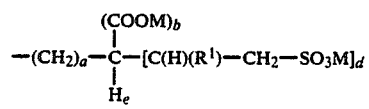  (I)

wherein a is 0 or 1, b is 1 or 2, d is 1 or 2, e is 0 or 1, b+d+e=3, $R^1$ represents H or a $C_1$ to $C_4$ alkyl group and M is a proton or another cation.

The invention also provides a process for the preparation of these novel thermostable crosslinked resins which comprises reacting
(a) a crosslinked resin comprising at least one substituted aryl group having a functional substituent group of general formula

  (II)

wherein a, b and e have the same meaning as in general formula (I), b+e=2, $R^2$ is a —CN or a carboxyester group, and if b is 2 each $R^2$ represents a —CN or a carboxyester group, and
(b) an ester of an alkenesulfonic acid of general formula

$$C(H)(R^1)=C(H)-SO_3R^3 \qquad (III)$$

wherein $R^1$ has the same meaning as in general formula (I) and $R^3$ is a hydrocarbyl group,
with the formation of an addition product of general formula

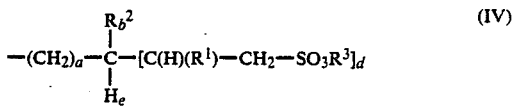  (IV)

wherein a, b, d, e and $R^1$ have the same meaning as in general formula (I), b+d+e=3, $R^2$ has the same meaning as in general formula (II) and $R^3$ has the same meaning as in general formula (III).
followed by hydrolysis of the addition product of general formula (IV) (hereinafter referred to as a Michael adduct) into a functional group of general formula (I).

DESCRIPTION OF THE INVENTION

In the preparation of the crosslinked resins carrying at least one functional group of general formula (I) the same crosslinked resins may in principle be employed as those employed in the preparation of the conventional sulfonated cation exchange resins and which have been described in numerous publications, such as: Encyclopedia of Polymer Science and Technology, Vol. 7, pp. 693-742.

The majority of the commercially available synthetic cation exchange resins are based on PS/DVB resins having a DVB content in the range of from about 0.5 to about 30% wt, preferably from about 2.0 to about 20% wt, of the PS/DVB resin, and although there is also a strong preference for these PS/DVB resins in the practice of the present invention, this should, however, not be construed to be a restriction of the invention. The primary requirement for these crosslinked resins, in order that they may suitably be employed in the preparation of the crosslinked functionalized resins of the present invention, is that they should be able to carry a halomethyl group, preferably a chloromethyl group. Hence, crosslinked resins obtained by polymerization of mixtures of e.g. styrene and divinylbenzene in the presence of a minor amount of one or more suitable comonomers, e.g. mono ethylenically unsaturated compounds such as acrylic or methacrylic acid and/or derivatives thereof, such as the corresponding esters, may also be employed. PS/DVB resins are divided into two categories, i.e. the gel-type PS/DVB resins, having a DVB content which is generally not much higher than 2 to 3% wt, and the macro-porous type of PS/DVB resins having a higher DVB content, generally $\geq 5\%$ wt.

The halomethylation is well known, in particular the chloromethylation of the above described crosslinked resins. Moreover, some types of chloromethylated PS/DVB resins are commercially available, e.g. gel-type chloromethylated PS/DVB resins which are also known as Merrifield resins.

In order to convert the chloromethylated PS/DVB resins into compounds of general formula (II), which have an activated CH or $CH_2$ group (hereinafter referred to as active methylene groups), they may be reacted with an inorganic cyanide, preferably an alkali- or alkaline earth metal cyanide, or with such compounds as diesters of malonic acid, e.g. diethyl malonate, esters of cyanoacetic acid, dicyanomethane, esters of acetic acid, and acetonitrile, with a preference for diethyl malonate.

The reaction of chloromethylated PS/DVB resins with an inorganic cyanide may conveniently be carried out in the presence of a solvent such as dimethylsulfoxide (DSMO) or N,N-dimethylformamide (DMF), as reported by Frechet et al, in Journal of Organic Chemistry, Vol. 44, No. 11 (1979), p. 1776 who also experienced an almost quantitative conversion in a two phase system in the presence of a phase transfer catalyst. This publication also describes the base-catalyzed reaction of chloromethylated PS/DVB resins with malonic acid derivatives under various reaction conditions. From this publication it is apparent that the choice of reaction conditions required to convert the chloromethylated PS/DVB resins into the corresponding activated methylene group-containing compound in high yield, will to a large extent be determined by the nature of the reactants, e.g., the inorganic cyanide and the malonic acid derivatives.

The base-catalyzed reaction between an active methylene group-containing compound and an ester of vinylsulfonic acid is known from a publication by H. Distler in Angewandte Chemie, international edition, Vol. 4 (1965), No. 4, pp. 300–311. Said publication, however, does not disclose reactions of esters of an alkenesulfonic acid with crosslinked resins having at least one aryl group carrying a group of general formula (II), but was restricted to simple, well defined, soluble compounds the derivatives of which are not suitable to be used in the same manner as the products of the invention. The type of esters of the alkene-sulfonic acid (hereinafter referred to as alkenesulfonate), which may conveniently be used in the practice of the present invention, may be selected from the group of alkyl and aryl esters with a preference for the aryl type of esters and more in particular for the phenyl ester as these are generally more stable under the prevailing alkaline reaction conditions.

Instead of employing the above mentioned alkenesulfonate esters, it is also possible to use the corresponding sulfonamides or sulfonylfluorides in the preparation of the Michael adducts. However, it will require considerably more severe conditions to convert the thus obtained sulfonamide adducts into the corresponding sulfonic acid group-containing products.

The alkenesulfonic acids, of which the corresponding esters of general formula (III) may conveniently be employed in the practice of this invention, include acids such as vinylsulfonic acid, 1-propene-1-sulfonic acid, 1-butene-1-sulfonic acid and 1-pentene-1-sulfonic acid. A preference is expressed for the esters of vinylsulfonic acid.

The base-catalyzed reaction between the alkenesulfonate and the active methylene group-containing PS/DVB resin may be carried out under a variety of conditions, e.g. suspending the active methylene group-containing resin in a solvent which will simultaneously dissolve the base catalyst and the alkenesulfonate, or alternatively using a two-phase liquid system with a phase transfer catalyst. It was found to be especially beneficial to conduct this reaction under phase transfer conditions. It will be understood by those skilled in the art that the choice of reaction conditions will to a large extent be determined by the nature of the reactants, i.e. the type of active methylene groups, the degree of crosslinking of the base resin, e.g. the PS/DVB resin, the alkenesulfonate and the type of catalyst used.

With this reaction, which may conveniently be carried out under reflux conditions, a molar excess of the alkenesulfonate over the equivalents of active hydrogen of the active methylene group proved to be beneficial. The composition of the products resulting from the reaction between the alkenesulfonate and the active methylene group-carrying PS/DVB resin may vary considerable. Primarily the composition will be determined by the nature of the active methylene groups, i.e. the number of active hydrogen atoms per group and the type of substituent e.g. —CN or —COOR. Furthermore, the degree of reaction between the active methylene group-carrying resin and the alkenesulfonate will be determining for the ultimate composition and may be strongly influenced by the accessibility of the active hydrogen atoms. Hence, when employing e.g. a PS/DVB resin with a high DVB content it will be more difficult to achieve a double substitution, or in some cases even a single substitution, compared to conditions where less crosslinked resins are employed e.g. the Merrifield resins. Moreover it is feasible under the prevailing alkaline reaction conditions that some of the alkenesulfonic acid ester and/or carboxy ester groups may be hydrolyzed and thereby introduce an additional variation in the ultimate composition of the Michael adduct.

In order to obtain the functionalized crosslinked resins of the present invention, the Michael adducts described above have to be submitted to a single- or multistep acid- and/or base-catalyzed hydrolysis reaction and when required this may be followed by an acidification step to obtain the products of the invention in the acid form. Both the sulfonic acid ester groups as well as the carboxy esters may conveniently be converted into the corresponding sulfonate and carboxylate groups via a base-catalyzed hydrolysis reaction, e.g. hydrolysis in 1N NaOH or under phase transfer conditions. For the conversion of the nitrile groups into the corresponding carboxy groups, via the intermediate amide groups, an acid-catalyzed hydrolysis is generally employed, e.g. at reflux temperature under strong acid conditions such as 60% wt sulfuric acid. Under these circumstances a quantitative conversion of the nitrile groups into the corresponding amide groups may be achieved. However, for a complete conversion of the intermediate amide groups into the corresponding carboxy groups somewhat more severe reaction conditions may be required, e.g. higher temperature, longer reaction times. Alternatively an incomplete conversion of the amide group into the carboxy group may be remedied by heating the ultimate resin in the acid form, i.e. after having conducted the base-catalyzed hydrolysis, in aqueous media.

When both an acid-catalyzed and a base-catalyzed hydrolysis is required for the conversion of the Michael adducts into the crosslinked resins of the invention, as is the case with Michael adducts derived from resins having an active methylene group of general formula (II) wherein one or more —CN groups are present, there is a preference to first apply the acid-catalyzed hydrolysis and carry out the base-catalyzed hydrolysis thereafter.

With the crosslinked resins of the invention wherein the sulfoalkyl group carries two carboxy groups it is possible, when desired, to submit this resin to an acid-catalyzed decarboxylation reaction to obtain the corresponding resin wherein the sulfoalkyl group carries only one carboxy group.

The invention will further be understood from the following examples wherein the reaction was followed by infrared (IR) analysis while product analysis data was obtained by way of elemental analysis and potentiometric titration.

EXAMPLE 1

Experiment 1-Preparation of chloromethylated macroporous PS/DVB Resin.

20 g of a non-commercial macroporous PS/DVB resin having a DVB content of 10% wt was suspended in 80 ml of chloromethyl methyl ether and 80 ml of chloroform and allowed to swell at room temperature for 60 minutes. Subsequently a mixture of 6 ml of stannic tetrachloride and 40 ml of chloromethyl methyl ether was added to the suspension, whereupon the reaction mixture started to reflux. The reaction mixture was kept at reflux temperature for 60 minutes. After cooling, the mixture was poured into 400 ml of dioxane/water 1/1 v/v and subsequently the resin was isolated by filtration and washed consecutively with 400 ml of each of the following solvent blends and solvents: dioxane/water 1/1 v/v; dioxane/water/conc.hydrochloric acid 5/4/1, dioxane and methanol. After drying at room temperature the resin was further dried over diphosphorous pentoxide (P$_2$O$_5$) at subatmospheric pressure (approximately 0.01 mm Hg) and 80° C. for 20 hours.

Experiments 2-4-Preparation of cyanomethyl-PS/DVB resin.

Sodium cyanide (NaCN) was added to a suspension of a chloromethylated PS/DVB resin in dry DMF and the mixture was stirred at 80° C. The resin was isolated by filtration and washed consecutively with DMF, water and methanol, and finally dried over P$_2$O$_5$ at subatmospheric pressure (approximately 0.01 mm Hg) and 80° C.

The amounts of reactants and washing liquids used and the reaction conditions are given in Table 1 together with the analytical data of the ultimate products.

TABLE 1

| Experiment | 2 | 3 | 4 |
|---|---|---|---|
| ClMe-Ps/DVB resin* | A | B | B |
| Meq Cl/g | 5.05 | 4.8 | 4.8 |
| ClMe-PS/DVB resin, g | 11.5 | 20 | 33 |

TABLE 1-continued

| Experiment | 2 | 3 | 4 |
|---|---|---|---|
| NaCN, mmol | 144 | 300 | 460 |
| DMF, ml | 120 | 200 | 285 |
| Temperature, °C. | 80 | 80 | 80 |
| Reaction time, hrs. | 16 | 16 | 24 |
| DMF, ml | 250 | 500 | 500 |
| Water, ml | 250 | 500 | 500 |
| Methanol, ml | 250 | 500 | 500 |
| CyMe-PS/DVB resin** yield g | 11 | 18 | 30 |
| Meq Cl/g | 0.17 | 0.1 | 0.01 |
| Meq N/g | 4.9 | 5.1 | 4.9 |

*ClMe-PS/DVB resin = chloromethyl-PS/DVB resin
A as prepared in experiment 1
B Merrifield resin based on PS/DVB containing 2% wt DVB
**CyMe-PS/DVB resin = cyanomethyl-PS/DVB resin Experiments 5-8-Preparation of the adduct of cyanomethyl-PS/DVB resin and phenyl vinylsulfonate.

Cyanomethyl-PS/DVB resin was suspended in dry THF, whereupon a molar excess of phenyl vinylsulfonate was added together with 1.4.7.10.13.16-hexaoxacyclooctadecane (18-Crown-6) and powdered potassium hydroxide (KOH) and the reaction mixture was stirred at reflux temperature. Subsequently the resin was isolated by filtration and washed with THF, THF/water 1/1 v/v, water and methanol, respectively and finally dried over P$_2$O$_5$ at subatmospheric pressure (approximately 0.01 mm Hg) and 80° C. The amounts of reactants and solvents employed and the reaction conditions are given in Table 2 together with the analytical data of the ultimate resin. By comparing the N and S contents of the different products, it can be seen that with the products of examples 7 and 8, on average more than one phenyl vinylsulfonate group had reacted onto one cyanomethyl group.

TABLE 2

| Experiment | 5 | 6 | 7 | 8 |
|---|---|---|---|---|
| CyMe-PS/DVB resin ex experiment | 2 | 2 | 3 | 4 |
| Meq N/g | 4.9 | 4.9 | 5.1 | 4.9 |
| CyMe-PS/DVB resin, g | 4.2 | 3.6 | 10 | 15 |
| PVS*, mmol | 43 | 53 | 144 | 210 |
| THF, ml | 200 | 200 | 250 | 375 |
| KOH, mmol | 30 | 30 | 72 | 107 |
| 18-Crown-6, mmol | 9.2 | 8.9 | 24 | 36 |
| Time, hrs. | 16 | 40 | 36 | 24 |
| THF, ml | 200 | 200 | 400 | 500 |
| THF/water, ml | 200 | 200 | 400 | 500 |
| Water, ml | 200 | 200 | 400 | 500 |
| Methanol, ml | 200 | 200 | 400 | 500 |
| Resin yield, g (Michael adduct) | 5.5 | 4.9 | 21.2 | 40 |
| Meq N/g | 3.7 | 3.6 | 2.3 | 2.0 |
| Meq S/g | 1.3 | 1.6 | 3.1 | 3.1 |

*PVS = phenyl vinylsulfonate prepared from 2-chloroethane-sulfonyl chloride and phenol as described by H. Distler in Angewandte Chemie, Intern., Ed., Vol. 4 (1965), No.4, page 301.

Experiments 9-12-Preparation of (3-sulfo-1-carboxy-propyl)-PS/DVB resin and/or [3-sulfo-1-carboxy-1-(sulfoethyl)-propyl]-PS/DVB resins.

The Michael adducts as prepared in examples 5-8 were suspended in 60% wt sulfuric acid (H$_2$SO$_4$) and the suspensions refluxed as indicated in Table 3. After isolation by filtration the resins were thoroughly washed with water, dried over P$_2$O$_5$ at subatmospheric pressure (approximately 0.01 mm Hg) and 80° C. and analyzed.

Subsequently the acid-hydrolyzed resins were refluxed with aqueous 2N NaOH and after filtration washed with water. Subsequently the resins were repeatedly stirred with an excess of aqueous 1N HCl to replace the Na+ by H+ and subsequently washed with water until the washing liquid was neutral. Finally, the resins were dried over $P_2O_5$ at subatmospheric pressure (0.01 mm Hg) and 80° C.

The amounts of reactants and solvents used and the reaction conditions are given in Table 3 together with the analytical data of the resins produced.

As it has previously been established that in the preparation of the Michael adducts according to examples 7 and 8 double substitution had occurred next to mono-substitution, the resins containing sulfonic acid groups prepared in examples 11 and 12 will contain structures of general formula (I) wherein a is 0 and d is 2 in addition to structures of general formula (I) wherein a is 0 and d is 1.

TABLE 3

| Experiment | 9 | 10 | 11 | 12 |
|---|---|---|---|---|
| Michael adduct ex experiment | 5 | 6 | 7 | 8 |
| Meq N/g | 3.7 | 3.6 | 2.3 | 2.0 |
| Meq S/g | 1.3 | 1.6 | 3.1 | 3.1 |
| Michael adduct, g | 5.3 | 4.7 | 15 | 25 |
| 60% wt $H_2SO_4$, ml | 40 | 40 | 120 | 200 |
| Reflux time, hrs. | 40 | 40 | 96 | 120 |
| Water, l | 1 | 1 | 3 | 5 |
| Meq N/g | 0.8 | 0.8 | 1.3 | — |
| Meq S/g | 1.3 | 1.5 | 2.8 | — |
| Acid hydr. Michael adduct, g | 2.8 | 4.6 | 10 | — |
| 2N NaOH, ml | 40 | 54 | 200 | 400 |
| Reflux time, hrs. | 90 | 90 | 54 | 120 |
| Water, l | 1 | 1 | 3 | 5 |
| Meq N/g | 0.7 | 0.6 | 1.0 | 0.5 |
| Meq S/g | 1.4 | 1.3 | 3.1 | 3.1 |
| Meq $SO_3H$/g | 1.1 | 1.0 | 2.7 | 2.6 |

EXAMPLE 2

Experiment 13-Preparation of [2,2-bis-(ethylcarboxy)-ethyl]-PS/DVB resin.

20 g (125 mmol) of diethyl malonate was added to a suspension of 2.25 g (75 mmol) of sodium hydride (NaH) (80% dispersion in paraffin oil) in 100 ml of dry toluene and stirred at room temperature to dissolve the NaH. Subsequently 5 g of Merrifield resin containing 5 meq Cl/g and based on a PS/DVB resin containing 2% wt DVB was added and the suspension was stirred at 80° C. for 90 hours. The resin was isolated by filtration and washed with 300 ml of each of the following solvents: tetrahydrofuran (THF), ethanol, water and ethanol and finally dried over $P_2O_5$ at subatmospheric pressure (approximately 0.01 mm Hg) and 80° C. yielding 7.2 g of "malonate" resin containing 0.13 meq Cl/g.

Experiment 14-Preparation of adduct of "malonate" resin and phenyl vinylsulfonate.

To a suspension of 4 g of [2,2-bis-(ethylcarboxy)-ethyl]-PS/DVB resin (as prepared in experiment 13) in 80 ml of dry THF, which suspension further contained 8 g of phenyl vinylsulfonate and 2 g of 18-Crown-6, 1.25 g of powdered KOH was added and the mixture stirred at reflux temperature for 16 hours. After cooling the resin was isolated by filtration and washed with 300 ml of each of the following solvents: ethanol, water, acetone and ethanol and finally dried over $P_2O_5$ at subatmospheric pressure (approximately 0.01 mm Hg) at 80° C. to yield 5.9 g of resin.

Experiment 15-Preparation of (4-sulfo-2,2-biscarboxy-butyl)-PS/DVB resin and (4-sulfo-2-carboxy-butyl)-PS/DVB resin.

4 g of the Michael adduct as prepared in experiment 14 was suspended in a mixture of 100 ml $H_2O$ and 100 ml ortho-dichlorobenzene. 40 g KOH and 5 g of Adogen 464 (registered trade mark) [methyltrialkyl ($C_8$–$C_{10}$)-ammonium chloride] were added to the suspension, whereupon the mixture was stirred at 100° C. for 90 hours. The IR spectrum showed that the carbonyl stretchband of the ester at 1740 cm$^{-1}$, had disappeared. The resin was isolated by filtration and washed successively with 1 l each of water, aqueous 1N HCl, water, ethanol and water and dried over $P_2O_5$ at subatmosheric pressure (approximately 0.01 mm Hg) and 80° C. The elemental analysis of the resin gave the following result: C 50.1%, H 6.5%, S 5.8% 1.8 meq S/g, while potentiometric titration showed the presence of two —COOH groups of the malonic acid moiety.

2.2 g of the [4-sulfo-2,2-(biscarboxy)-butyl]-PS/DVB resin was suspended in 30 ml of aqueous 6N HCl and refluxed for 140 hours. After cooling the resin was isolated by filtration and thoroughly washed with 1000 ml of water and dried over $P_2O_5$ at subatmospheric pressure at 80° C. Elemental analysis of this product resulted in: C 53.9%, H 6.7%, S 6.75% 2.1 meq/g. Potentiometric titration confirmed the removal of one —COOH group and gave 2.2 meq $SO_3H$/g.

EXAMPLE 3

Experiments 16-18-Hydrolytic stability of (3-sulfo-1-carboxy-propyl) -and (4-sulfo-2-carboxy-butyl)-PS/DVB resins.

0.1–1 g of resin (in the acid form) was suspended in 50 ml of water which was contained in a teflon beaker. Said beaker could be tightly fitted in a Hastelloy (registered trade mark) autoclave equipped with a thermowell which had been covered with teflon tape.

The autoclave and the suspension were flushed with argon and the suspension heated to 200° C. for a period as indicated in Table 4. After each indicated period of time the resin was washed with 1N HCl and water, respectively before again being suspended in 50 ml of water and continuation of the stability tests. The results are given in Table 4.

TABLE 4

| Experiment | Resin | Time at 200° C. hrs. | $SO_3H$ meq/g |
|---|---|---|---|
| 16 | (3-sulfo-1-carboxy-propyl)-PS/DVB ex experiment 10* | 0 | 1.2 |
|  |  | 90 | 1.1 |
|  |  | 250 | 0.9 |
|  |  | 500 | 0.8 |
| 17 | (3-sulfo-1-carboxy-propyl)-PS/DVB ex experiment 11* | 0 | 2.9 |
|  |  | 300 | 2.6 |
|  |  | 430 | 2.2 |
| 18 | (4-sulfo-2-carboxy-butyl)-PS/DVB ex experiment 15 | 0 | 2.0 |
|  |  | 100 | 1.9 |
|  |  | 200 | 1.8 |

*(3-sulfo-1-carboxy-propyl)-PS/DVB resins ex experiments 10 and 11 were heated as aqueous suspensions at 200° C. for 46 and 90 hours respectively and after cooling washed with 1N HCl to convert the amide group into the corresponding carboxy groups, prior to being used for assessment of thermostability.

EXAMPLE 4

Experiments 19-22-Catalytic activity of (3-sulfo-1-carboxy-propyl)- and (4-sulfo-2-carboxy-butyl)-PS/DVB resins.

The catalytic activities of the different resins were determined employing the acid-catalyzed hydrolysis of sucrose i.e.

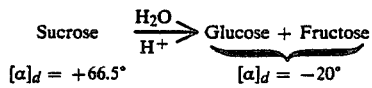

$$\text{Sucrose} \xrightleftharpoons[\text{H}^+]{\text{H}_2\text{O}} \underbrace{\text{Glucose} + \text{Fructose}}$$

$[\alpha]_d = +66.5°$      $[\alpha]_d = -20°$ as a convenient test reaction.

An amount of resin corresponding with approximately 0.3 meq of —SO$_3$H groups was added to a 10 ml bottle containing 3 ml of a 10% (wt) solution of sucrose in distilled water, whereupon the bottom was closed with a screw cap. The bottle was placed in a Tamson Precision shaking thermostat at 50° C. After a predetermined time the reaction was quenched by cooling and the catalyst removed by centrifugation. The optical rotation of the supernatant phase was measured with a Perkin Elmer 241 polarimeter using the 5890 Å filter. The conversion x was calculated from $$x_t = (\alpha_o - \alpha_t)/(\alpha_o - \alpha_\infty)$$

wherein $\alpha_\infty = -20 \, \alpha_o/66.5$

From the conversions $x_t$ the observed first-order rate constant, k, was calculated according to $$k = (1/t) \cdot \ln(1-x_t)$$

and the catalytic activity, A, according to $A = k \cdot V/W$ wherein W is the weight of resin (in g) used in the volume V (in l) of the solution. The resins employed in these experiments together with their catalytic activities are given in Table 5.

TABLE 5

| Experiment No. | Resin source | SO$_3$H, meq/g | A, s$^{-1} \cdot$g$^{-1} \cdot$l |
|---|---|---|---|
| Experiments | | | |
| 19 | 9 | 1.1 | 1.2 × 10$^{-6}$ |
| 20 | 15 | 2.2 | 3.4 × 10$^{-6}$ |
| 21 | 11 | 2.7 | 4.5 × 10$^{-6}$ |
| 22 | 11* | 2.2 | 4.4 × 10$^{-6}$ |
| Comparative Experiments | | | |
| A | Amberlite$^{(1)}$ IR 120 H$^{(2)}$ | 4.3 | 3.6 × 10$^{-6}$ |
| B | Amberlite$^{(1)**}$ IR 120 H$^{(2)}$ | 1.6 | 1.6 × 10$^{-6}$ |

$^{(1)}$registered trade mark
$^{(2)}$Amberlite 120 H is a commercially available ringsulfonated PS/DVB resin
*Resin as in experiment 21, but after heating for 90 hours followed by an additional 430 hours in aqueous suspension at 200° C. with washing with acid and water, respectively after each of the stated periods.
**Same resin as in comparative experiment A but aged in aqueous suspension at 200° C. for 100 hours, and subsequently washed with acid and water, respectively prior to being used as catalyst.

From the experimental data as given in Examples 3 and 4, it can be seen that these novel ion exchange resins are extremely stable at elevated temperatures in water and moreover that they possess a high catalytic activity making them potentially suitable for a wide range of applications.

What is claimed is:

1. A crosslinked resin composition comprising at least one substituted aryl group having a functional substituent group of general formula

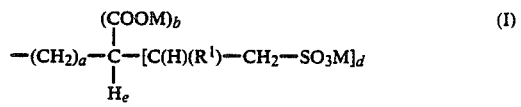

$$-(CH_2)_a-\underset{\underset{H_e}{|}}{\overset{\overset{(COOM)_b}{|}}{C}}-[C(H)(R^1)-CH_2-SO_3M]_d \quad (I)$$

wherein a is 0 or 1, b is 1 or 2, d is 1 or 2, e is 0 or 1, b+d+e=3, R$^1$ represents H or a C$_1$ to C$_4$ alkyl group and M is a proton or another cation.

2. The composition of claim 1, wherein the resin is made from a copolymer of a monovinylaromatic hydrocarbon compound and a divinylaromatic hydrocarbon compound, the divinylaromatic compound being present in an amount between about 0.5 to about 30% wt of the copolymer.

3. The composition of claim 2, wherein the resin is made from a polystyrene-divinylbenzene copolymer, the divinylbenzene being present in an amount between about 2 to about 20% wt of the copolymer.

4. The composition of claim 1, wherein the functional group is

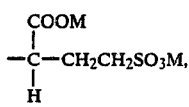

$$-\underset{\underset{H}{|}}{\overset{\overset{COOM}{|}}{C}}-CH_2CH_2SO_3M,$$

and M has the same meaning as in general formula (I).

5. The composition of claim 1, wherein the functional group is

$$-\overset{\overset{COOM}{|}}{C}(-CH_2CH_2SO_3M)_2,$$

and M has the same meaning as in general formula (I).

6. The composition of claim 1, wherein the functional group is

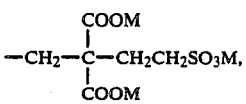

$$-CH_2-\underset{\underset{COOM}{|}}{\overset{\overset{COOM}{|}}{C}}-CH_2CH_2SO_3M,$$

and M has the same meaning as in general formula (I).

7. The composition of claim 1, wherein the functional group is

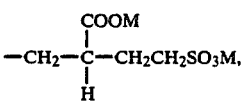

$$-CH_2-\underset{\underset{H}{|}}{\overset{\overset{COOM}{|}}{C}}-CH_2CH_2SO_3M,$$

and M has the same meaning as in general formula (I).

* * * * *